(12) United States Patent
Lilenfield

(10) Patent No.: US 6,545,667 B1
(45) Date of Patent: Apr. 8, 2003

(54) APPARATUS FOR A CONVENIENT AND COMFORTABLE CURSOR CONTROL DEVICE

(76) Inventor: David M. Lilenfield, Apt. 4305, 2158 Cumberland Pkwy., Atlanta, GA (US) 30339

( * ) Notice: Subject to any disclaimer, the term of this patent is extended or adjusted under 35 U.S.C. 154(b) by 250 days.

(21) Appl. No.: 09/657,406

(22) Filed: Sep. 8, 2000

Related U.S. Application Data

(63) Continuation-in-part of application No. 09/489,796, filed on Jan. 24, 2000, and a continuation-in-part of application No. 09/379,646, filed on Aug. 23, 1999.

(51) Int. Cl.[7] .................................................. G09G 5/00
(52) U.S. Cl. ....................... 345/169; 345/157; 345/158; 345/173
(58) Field of Search ................................. 345/156, 157, 345/158, 159, 160, 161, 162, 163, 167, 168, 169, 173; 74/471 R, 471 XY

(56) References Cited

U.S. PATENT DOCUMENTS

| | | | |
|---|---|---|---|
| 4,562,347 A | 12/1985 | Hovey et al. | 250/221 |
| 4,862,165 A | 8/1989 | Gart | 341/20 |
| 5,063,289 A | 11/1991 | Jasinski et al. | 250/221 |
| 5,280,276 A | 1/1994 | Kwok | 345/167 |
| 5,374,942 A | 12/1994 | Gilligan et al. | 345/157 |
| 5,428,368 A | 6/1995 | Grant | 345/163 |
| 5,648,798 A | 7/1997 | Hamling | 345/163 |
| 5,657,051 A | 8/1997 | Liao | 345/163 |
| 5,666,138 A | 9/1997 | Culver | 345/161 |
| 5,668,574 A | 9/1997 | Jarlance-Huang | 345/158 |
| 5,726,684 A | 3/1998 | Blankenship et al. | 345/167 |
| 5,760,766 A | 6/1998 | Auber et al. | 345/167 |
| 5,767,841 A | 6/1998 | Hartman | 345/167 |
| 5,914,702 A * | 6/1999 | Derocher et al. | 345/157 |
| 6,031,518 A * | 2/2000 | Adams et al. | 345/156 |
| 6,292,175 B1 * | 9/2001 | Sheehan et al. | 345/167 |
| 6,297,808 B1 * | 10/2001 | Yang | 345/167 |

OTHER PUBLICATIONS

David Lilenfeld, Inventor, Disclosure No. 448,502 entitled "Flying Mouse"; date stamped Dec. 11, 1998 by the U.S. Patent and Trademark Office, 2 pages.

* cited by examiner

*Primary Examiner*—Xiao Wu

(57) ABSTRACT

The present invention is a cursor control device to be used in conjunction with a computer, receiver or other processing unit that allows for convenient and comfortable use while being hand held or while resting on the desk-top. The cursor control device being comprised of a body with a shape for fitting in a user hand so a user can operate the cursor control device in hand held and desk-top uses. The body also being comprised of a cursor control, at least one button, and having a control circuit inside the body, which is connected to at least one button and the cursor control. The device further having a communication link connectable between said control circuit and a processing unit.

2 Claims, 6 Drawing Sheets

APPARATUS FOR A CONVENIENT AND COMFORTABLE CURSOR CONTROL DEVICE

This is a continuation-in-part of application entitled "Cursor control device for convenient and ergonomic hand held or work surface use", Ser. No. 09/489,796, on Jan. 24, 2000, and a continuation-in-part of application entitled "Cursor control device for convenient and ergonomic hand held or work surface use", Ser. No. 09/379,646; filed on Aug. 23, 1999, all of the foregoing of which are now pending and are incorporated herein by reference.

TECHNICAL FIELD

The present invention is generally related to a computer data input tool and, more particularly, is related to an apparatus for providing control of a computer cursor which can be used conveniently and comfortably while resting on a flat work surface or while being held in the user's hand.

DISCUSSION OF RELATED ART

Generally, every computer sold today comes with some type of a cursor control device. The most popular of these devices is the mouse, which has become the ubiquitous symbol of modem computing. Other such devices are the trackball, touchpad, isometric post and navigation dome.

Originally, computers were primarily driven by the user entering text; thus, the cursor control device was secondary to the keyboard. Then, and still today, the keyboard occupied the prominent position at the workstation with the cursor control device laying to the side of the keyboard for convenient intermittent use.

With the advent and introduction of the graphical user interface (GUI), though, today's computers are driven much more by the cursor control device than ever before. Almost every computer has a GUI operating system, such as Microsoft Windows, MacOS, or Corel Linux, and virtually every computer application is a GUI, as is the World Wide Web ("WWW"). Since use of a GUI is heavily dependent upon the "pointing and clicking" technique accomplished by a cursor control device (as opposed to merely the entry of text through the keyboard) the importance of cursor control devices to computer use has increased tremendously. In fact, research directed by Peter W. Johnson of the University of California at San Francisco Ergonomics Lab, concluded that for the average user the cursor control device is utilized for one-third to two-thirds of the working time on a computer. However, as discussed below, today's cursor control devices suffer many deficiencies considering the use now required of them.

Considering each device separately, a mouse is a substantially immobile device, which generally includes a ball that depends from its underside and rests upon a flat work surface. The ball is rotated while in contact with the work surface by movement of the mouse which causes a corresponding movement of the cursor on the computer screen. Because the mouse depends on the flat work surface, the mouse must be used while laying on the desktop.

Being able to use it only on the desktop is a major deficiency. To reach and operate the mouse, the user must lean forward from his or her seated position, bend his or her arm at the elbow, forwardly extend his or her forearm, wrist, and hand and keep this rigid position the entire time the device is being used. Maintaining this "frozen" position for even a short time is uncomfortable, tires the user's back, and muscles of the shoulder, elbow, forearm, wrist and hand, and can ultimately lead to repetitive stress injuries (RSIs). This is particularly true since the mouse is now used for such prolonged periods of time. Also, because of discomfort, users are forced to take frequent breaks, which decreases productivity.

Mice suffer further deficiencies in that they force the user's hand into an unnatural prone or palm-down position. (See FIG. 1). Furthermore, actuating the buttons on mice causes hand fatigue since the buttons typically require the unnatural downward pressing of the user's fingers (See FIG. 1), as opposed to the more natural inward flexing of the finger or fingertip. The longer the mouse is used, the more pronounced are its deficiencies.

Another deficiency of mice is that they necessitate a certain amount of available work surface space upon which to move. Also, having to rest the mouse on the desktop is also problematic because the work surface may be at an uncomfortable height for the user.

Mice also typically require mouse pads which are used to cover the desktop to provide a prime surface area over which to move the mouse. Mouse pads are awkward in that they are relatively small and thus limit the space for movement of the mouse. This is particularly problematic as larger screens become popular because the mouse must traverse a greater distance in order to effectuate movement of the cursor across the larger screen. Furthermore, mouse pads tend to wear quickly and gather dust that ends up collecting on the ball and interfering with mouse functions. Mouse pads are also troublesome since they consume space on an already limited desktop and can interfere with placement of the keyboard at the workstation.

In addition to these inherent deficiencies and inadequacies of mice, mice cannot generally be used while being hand held, mainly because the ball is on the underside of the body. In that position, the user cannot easily or comfortably manipulate the ball nor can the buttons, which are on the topside of the mouse, be simultaneously actuated. Also, once pressure is applied to the ball by the user, or once the device is turned at an inverted angler, it recedes into the body of the device, beyond the user' reach. In short, not only do mice suffer several major deficiencies in comfort, convenience and practicality, but they are also not suitable for hand held use.

A trackball is another type of cursor control device and is somewhat analogous to an upside mouse that houses a ball that protrudes through the top of the trackball body and is manipulated by the user's fingers, hand or thumb. As with mice, rotation of the ball causes a corresponding movement of the cursor on the computer screen. Trackballs, also like mice, are dependent upon the desktop, thus, the problems associated with mice, discussed above, also exist with trackballs. Namely, since trackballs depend on the desktop, the user must maintain a frozen, rigid position to operate the trackball, thereby increasing the likelihood of feeling pain, discomfort or incurring a RSI particularly during prolonged use. Also, because the user must maintain this position, he or she must take frequent breaks which reduces productivity. Trackballs also require a certain amount of available space on the desktop.

Furthermore, most trackballs are not suitable for hand held use because the bodies and balls are generally too large to be hand held and because the balls and buttons are not aligned such that they could be activated simultaneously.

Some trackballs, though, are intended (though not ideal) for hand held use. However, these trackballs are deficient in that they are not able to be used while laying on the desktop.

An attempt to use a hand held trackball, which have been designed similar to television remote controls, while it is laying on the desktop fails for several reasons. First, many of these trackballs have buttons on their underside which, to activate, would require the user's fingers to wrap around his or her fingers under the device, preventing the device from lying flat on the work surface. Furthermore, even if those devices had buttons on the top, the buttons and the ball would not be aligned for comfortable or convenient operation if laying on the work surface. This problem occurs mainly because the buttons are parallel with one another, as opposed to mirroring the position of the human thumb in relation to other fingers. Moreover, these trackballs are generally not suitable for use on the desktop because during such use the user's wrist would be forced into an unnatural downward and prone position instead of the preferred neutral position. Other trackball devices meant for hand held use are not suitable for use while resting on the desktop because they are typically too small. Therefore, as can be seen, trackballs which are meant for hand held use suffer a major deficiency in that they are not suitable for use while laying on the desktop.

Another type of cursor control device being used and sold today is a touchpad which is a flat, immobile base having a touch-sensitive membranous sensor pad on its top-surface. When a portion of the pad is touched it either mechanically depresses or registers a change in temperature effected by the user's finger to sense the location on the pad with which the user made contact. Circuitry within the touchpad translates the sensed location into a command to the computer to control the location of the cursor on the computer screen.

Touchpads, like mice, are dependent upon the desktop. Thus, the deficiencies of mice discussed above apply equally to touchpads. Namely, the user must maintain a rigid, frozen position which causes pain and discomfort and, over an extended period of time, RSI. This is aggravated if the desktop is at an uncomfortable height for the user. Also, with touchpads to activate a button, the user must put unnatural downward pressure with his or her finger, instead of a more natural inward flexing. Likewise, touchpads are not suitable for hand held because they are generally embedded into the keyboard or computer itself. Touchpads are also known to be hypersensitive, thus reacting to environmental influences—such as moisture from a user's finger—causing unintended cursor movement. They also cannot be used while hand held, because the buttons are not aligned to allow for simultaneous use with the pad.

A fourth type of cursor control device is the isometric post. An isometric post is a small force sensing stick, commonly referred to as an "erasure-head," such as IBM's ® TRACKPOINT™. Isometric posts are typically situated among the buttons of the keyboard. The isometric post is operated by the user applying directional pressure with a single finger on the top of the post causing the transmission of data to the computer to control the cursor on the computer screen.

Isometric posts are also dependent upon the desktop and suffer the same deficiencies as discussed above in connection with mice and touchpads. Isometric posts are likewise not suitable for hand held use as they are typically embedded in the keyboard of laptop computers. Furthermore, they are too small to be hand held and their buttons are not properly aligned for convenient or comfortable use.

An additional cursor control device is a navigation dome, which is a directional button which uses a sensing mechanisms incorporating non-contacting magnetic technology. The sensing mechanism is operated by the user applying directional pressure with a finger. Navigation domes, like mice, touchpads, and isometric posts, are dependent upon the desktop. Thus, all the deficiencies of mice discussed above apply equally to navigation domes. Namely, the user must maintain an uncomfortable position, make an unnatural downward pressing and place his or her hand in an inferior palm down position. All this is aggravated when the desktop is at an uncomfortable height. Furthermore, navigation domes are not suitable for hand held because they generally are embedded into a much larger device which cannot be hand held or have buttons which are not properly aligned with the dome to allow for convenient or comfortable hand held use.

The fact that cursor control devices known in the art are inadequate for modern computer use, especially with GUIs, is also shown by cottage industry of supplemental products meant to ease the aforementioned discomfort and infliction of RSI associated with these devices. Wrist pads and wrist braces, for example, are meant to support the user's wrist while using the cursor control device, particularly during prolonged operation because of GUIs. Interestingly, use of these supplemental products are now thought to increase the chances of incurring a RSI since they add more pressure to the user's hand and cause muscle atrophy since the user tends not to use his or her muscles at all while using these products.

Thus, it can be seen that cursor control devices known in the art are generally of two types. One type being those intended for use while they are laying on the desktop, and the other being those intended for hand held use. However, none are convenient or comfortable for both uses.

Thus, a heretofore unaddressed need exists in the industry to address the aforementioned deficiencies and inadequacies.

BRIEF SUMMARY OF THE INVENTION

The device of the present invention relates generally to a data input tool and, more specifically, to a device to control a cursor on a computer, receiver or other processing unit, in which the cursor control device can be used conveniently and comfortably while resting on a flat work surface or while being held in the user's hand. Briefly described, in architecture, the cursor control device is comprised of a body with a shape for fitting in a user hand so a user can operate the cursor control device in hand held and desk-top manners. The body also being comprised of a cursor control, at least one button, and having a control circuit inside the body which is connected to at least one button and the cursor control. The device further having a communication link connectable between said control circuit and a processing unit.

BRIEF DESCRIPTION OF THE DRAWINGS

The invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION OF THE INVENTION

The present invention will now be described in detail with specific reference to the drawings. While the invention will be described in connection with these drawings, there is no intent to limit it to the embodiment or embodiments disclosed therein. On the contrary, the intent is to cover all alternatives, modifications, and equivalents included within the spirit and scope of the invention as defined by the appended claims.

Figure 2:
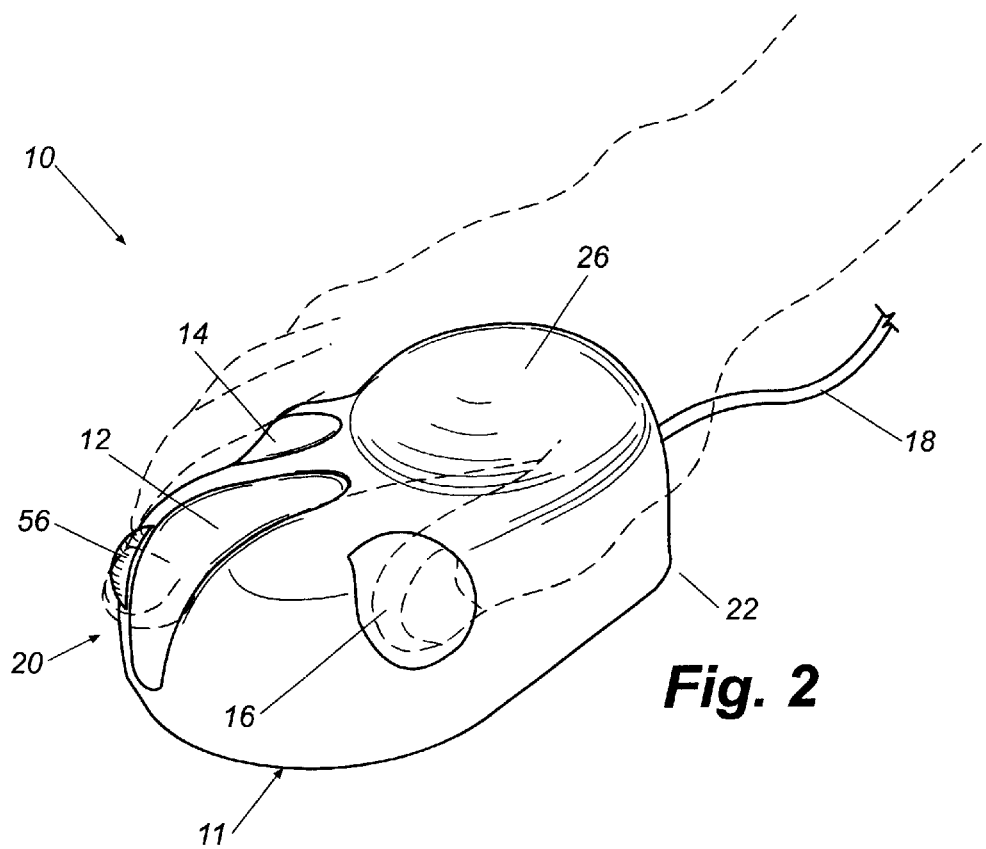
FIG. 2 is a top view of the device which shows the device being used on a flat work surface.

Turning now to the drawings, FIG. 2 illustrates the cursor control device 10 which is generally comprised of a body 11, a cursor control 16, and a cable 18. For the purpose of brevity, the cursor control device 10 described in this section is a right-handed version. However, it is to be understood that the description shall also apply, in all respects equally, to the mirror image of the cursor control device 10 (i.e., a left-handed version).

The body 11 is shaped so as to comfortably fit in the user's hand with a cursor control 16 positioned at about the front corner of the body 11, and may include a swell 26 to fit the user's palm. In this embodiment, the distance from the bottom edge 22 to the cursor control 16 is equal to the approximate length of the average person's thumb. While such distance is preferably about 3½ inches, it may also be anywhere between 2 to 4 inches, depending on the design. The width of the body 11 is less than the width of the average person's hand, about 2 inches, but may also be anywhere between 1 to 3 inches depending on the design. The device is about ½ to 1½ inches deep such that it can be comfortably and conveniently held by the user with moderate contraction of the fingers and thumb. Preferably, the body 11 is made of an injection molded plastic, however, other types of materials are acceptable, such as, but not limited to, other plastics, durable foam, rubber, neoprene, "bean-bag," or other malleable material and the like.

The cursor control 16 illustrated in FIG. 2 is a ball. However, the cursor control 16 may be of other types, including, but not limited to, an isometric post, a touchpad, a navigation dome, and the like. With the cursor control 16 as a ball, as illustrated in FIG. 2, the ball protrudes above the body 11 with the remaining portion inside the body 11. The cursor control 16 as a ball is preferably made of a smooth, hard plastic, as is known in the art. However, the ball may also be made of a more tactical material to prevent inadvertent slippage. Preferably, the cursor control 16 as a ball is as large as possible to give the user accurate control over the cursor during both hand held and desktop use but is limited so that it can be easily and comfortably manipulated by the user's thumb and minimizes the amount of weight added to the device 10. Spring loaded mechanisms (not shown) inside the body 11 urge the cursor control 16 as a ball upward, partially through the top of the body 11, preventing the ball from receding into the body 11. The size of the cursor control 16 as a ball as shown in FIG. 2 is one of various sizes that may be suitable for the cursor control device 10.

Also illustrated in FIG. 2 are buttons used to send data to the computer, receiver or other processing unit: a left button 12 and a right button 14 which are disposed towards the forward top of the body 11 and slope downward along the body's 11 frontal curvature 20. The buttons 12 and 14 are angled so as to align the user's thumb with the cursor control 16 and allow the ulnar fingers to occupy the side of the body 11 opposite the cursor control 16.

The distance between the left button 12 and the cursor control 16 is the approximate width between the upper portions of the average user's thumb and index finger when held in a natural position. While such distance on the body 11 is approximately ½ inch, it may be anywhere between ¼ to 1 inch, depending on the design. The width of each button 12 and 14 is slightly greater than the width of the average person's finger such that when the user's finger rests on or activates one of the buttons 12 and 14 the entire width of the finger is accommodated. While such distance is preferably about 1 inch, it may be anywhere between ¼ to 1½ inches, depending on the design. The top of each button 12 and 14 may be slightly concave so as to accommodate the user's finger and increase the convenience and comfort of use.

Figure 1:
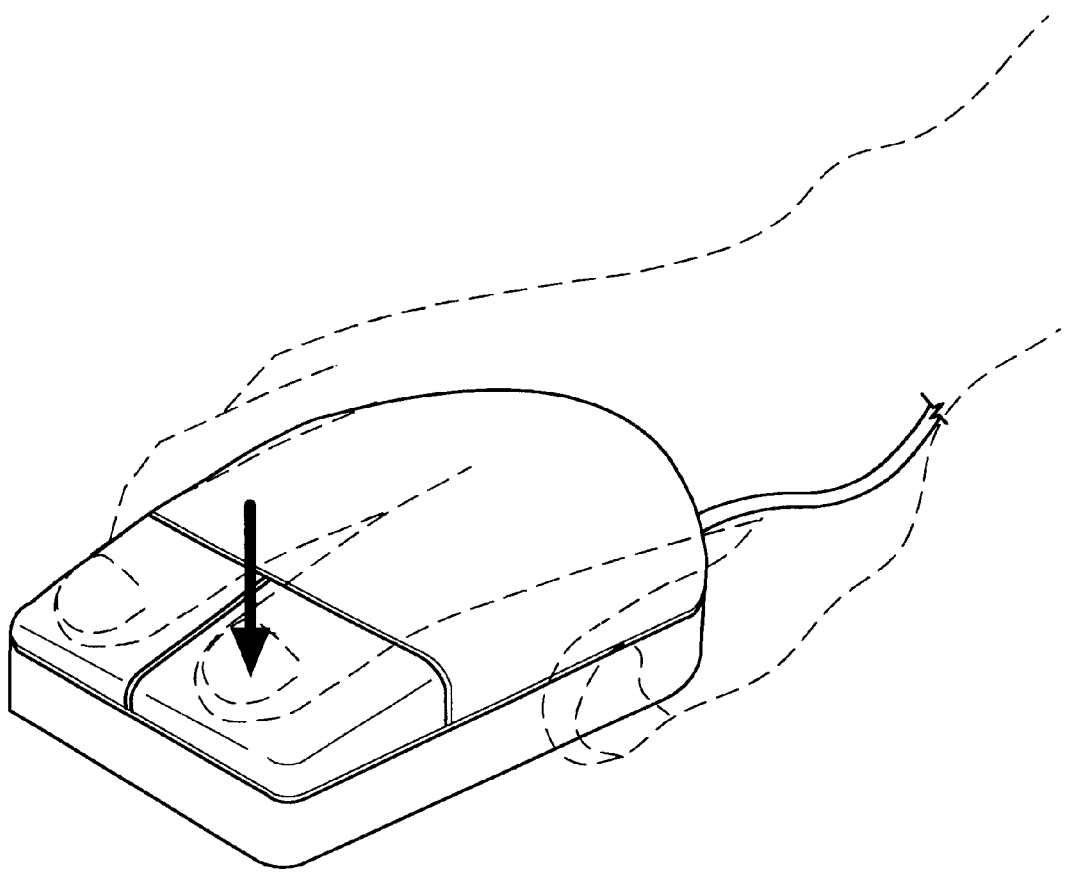
FIG. 1 is a prior art drawing which shows use of prior art.

While the buttons 12 and 14 offer sufficient resistance such that the user's fingers may touch the buttons 12 and 14 without inadvertently activating the buttons 12 and 14, the buttons 12 and 14 are sensitive enough to allow for easy actuation. Also, because the buttons 12 and 14 occupy the frontal curvature 20 of the body 11 the buttons 12 and 14 can be activated by the inward flexing of the user's finger or fingertip, unlike ordinary mice which require a downward pressing as illustrated in FIG. 1.

The cursor control device 10 may include a cable 18 fixed in a single position, preferably centered on the bottom end of the body 11 to provide power for the cursor control device 10. The cable 18 can also connect the cursor control device 10 with a computer, receiver or other processing unit for transmission of data. Because the cursor control device 10 is capable of being used while the user's arm moves freely about, the cable 18 may be longer than the six-foot cable 18 typically found in the art.

Also illustrated in FIG. 2 is a scroll wheel 56 disposed between the buttons 12 and 14. The scroll wheel 56 consists of a spring-loaded supplementary control in the body for the device to generate additional data to be transmitted to the computer, receiver or other processing unit to specifically control the rate and direction of scrolling. The location of the scroll wheel 56 in FIG. 2 is one of several locations that may be suitable for convenient and comfortable use.

Figure 3:
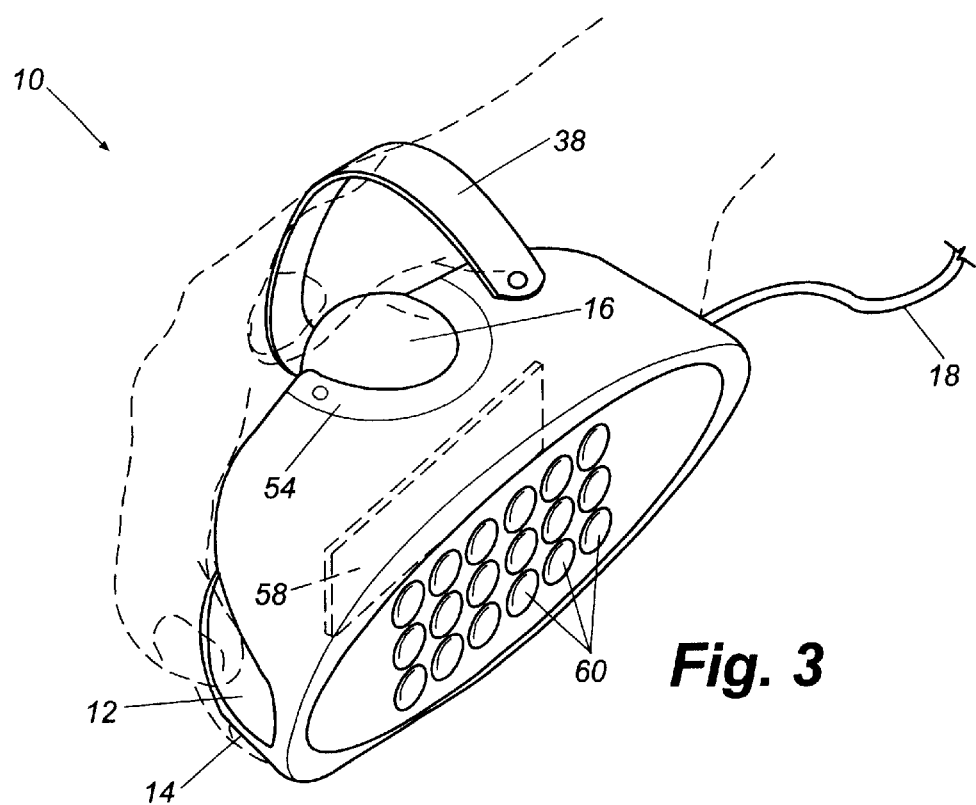
FIG. 3 is an underside view of the device which shows the device during hand held use.

FIG. 3 illustrates the cursor control device 10 being used while hand held. While because of the size and shape of the cursor control device 10 the cursor control device 10 can be conveniently and comfortably held, one feature which can be included to assist in the operation of the cursor control device 10 when being hand held is a detachable strap 38. The user can wrap the detachable strap 38 around the topside of his or her hand to firmly attach the cursor control device 10 to the user's hand. This allows the cursor control device 10 to be used without having to be grasped.

FIG. 3 also illustrates a narrow collar 54 surrounding the cursor control 16 as a ball that permits access to the ball and internal parts of the device 10, particularly for cleaning. The narrow collar 54 may be removable or unremovable depending on manufacturing methods.

The cursor control device 10 functions with cursor control 16, the buttons 12 and 14, and the cable 18 being connected to a control circuit 58. As the cursor control 16 is manipulated and buttons 12 and 14 are activated by the user, it transmits data through the control circuit 58 to the computer, receiver or other processing unit.

Further illustrated in FIG. 3, is an embodiment of the cursor control device 10 including numerous concave keys 60 located on the bottom of the cursor control device 10 for sending additional data from the cursor control device 10 to the computer, receiver or other processing unit. These keys 60 may be used for volume control, channel setting and on/off functions, such as for computer based television programming or Internet-enabled televisions. These keys 60 may also be made to allow the user to enter text into a computer, similar to a keyboard. The keys 60 to be depressed by the user's finger or a small pen.

Figure 9:
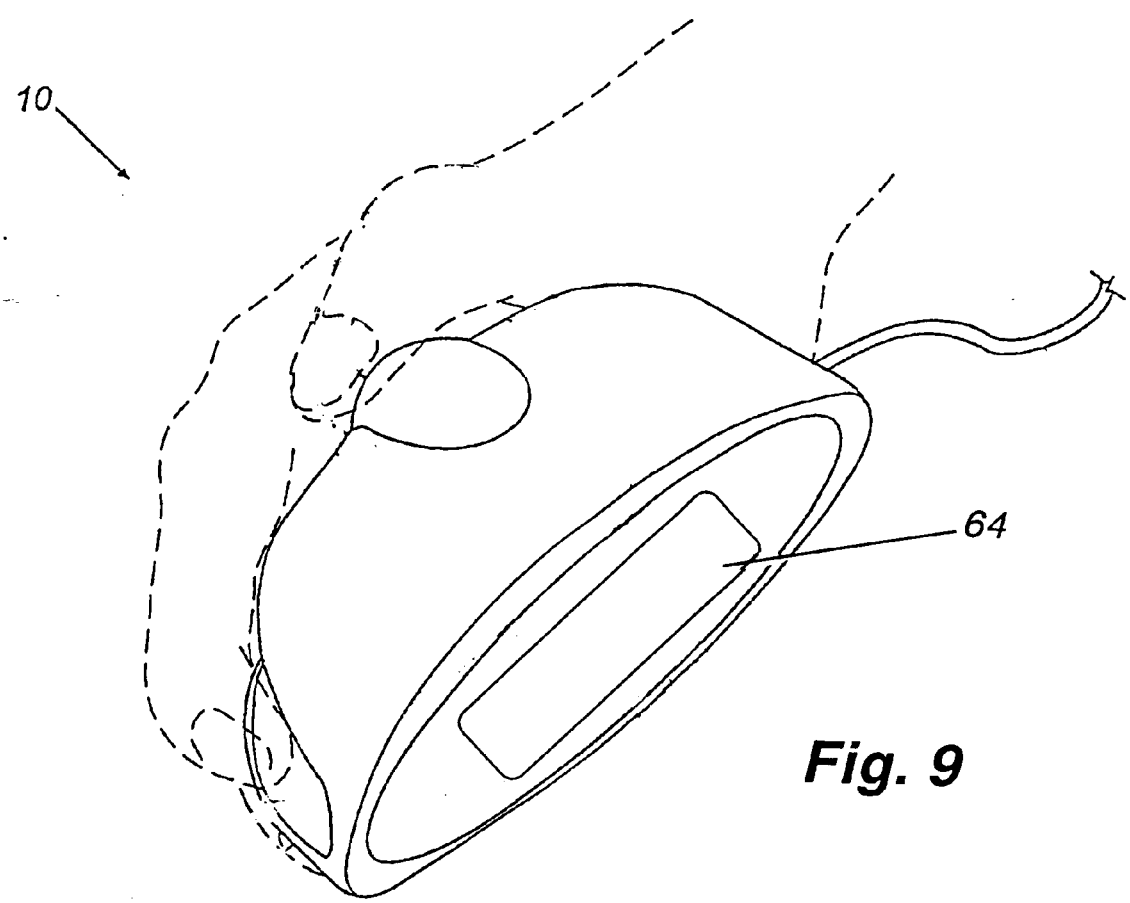
FIG. 9 is a view of an alternative embodiment with a touch-sensitive screen display on the bottom side of the cursor control device.

FIG. 9 shows a touch-sensitive display screen 64 included on the bottom side of the cursor control device 10, instead of numerous concave buttons 60. The touch-sensitive display screen 64 to be used to send additional data from the cursor control device 10 to the computer, receiver or other processing unit. The touch-sensitive display screen 64 to be slightly recessed in the body so not to be inadvertently activated when the device is laying on the work surface.

Figure 4:
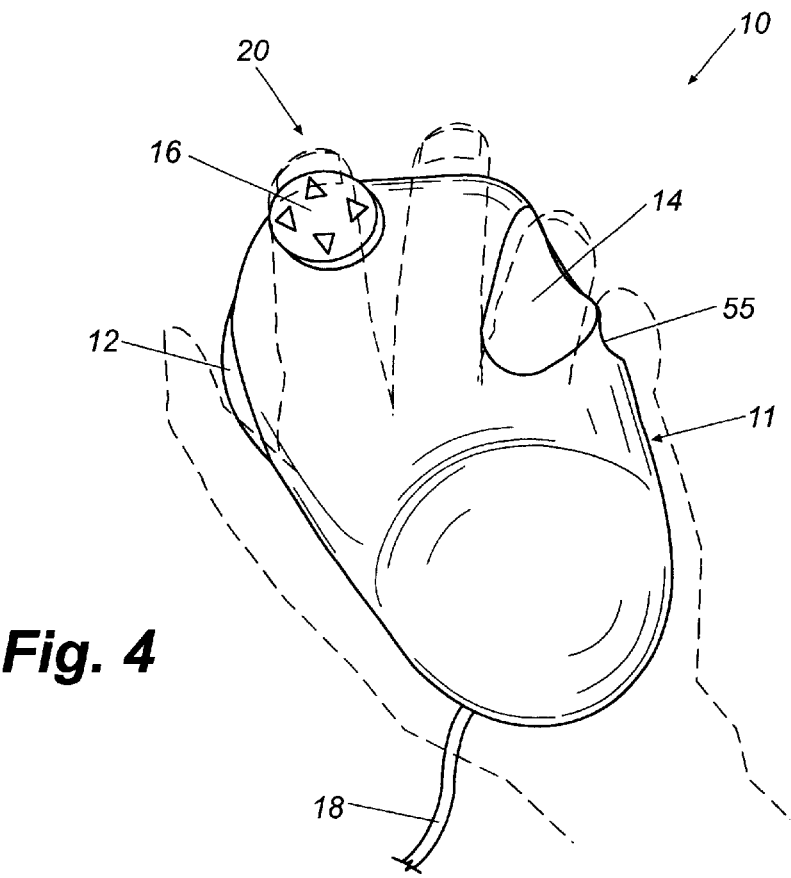
FIG. 4 is a top view of an alternative embodiment with the cursor control located in the center of the device.

Illustrated in FIG. 4 is the location of the cursor control 16 at the center, forward portion of the body 11. In FIG. 4 the cursor control 16 shown is a navigation dome, though the cursor control 16 may be any of the types previously described and the like. In this location, the cursor control 16 is operated by the user's index or middle finger, depending on his or her preference. Also in this embodiment, a button 12 may be located on the side of the body 11 for activation by the thumb of user. In an alternative embodiment, one or both buttons 12 and 14 may exist and might cause the cursor control 16 to shift slightly.

Still referring to FIG. 4, another alternative embodiment occurs with the cursor control device 10 having one or more slight grooves 55 on the side opposite the cursor control 16. These groves 55 accommodate the user's ulnar fingers and work to align the user's hand for easy and comfortable activation of the cursor control 16 and the buttons 12 or 14.

In another alternative embodiment, as illustrated in FIG. 4, the cable 18 is positioned slightly off from the center of the body 11 so as to fit in the crevice of the user's palm. As another alternative, the cable 18 can be positioned at the top of the cursor control device 10 at the frontal curvature 20 between buttons 12 and 14 so as not to interfere with free use of the cursor control device 10.

Figure 5:
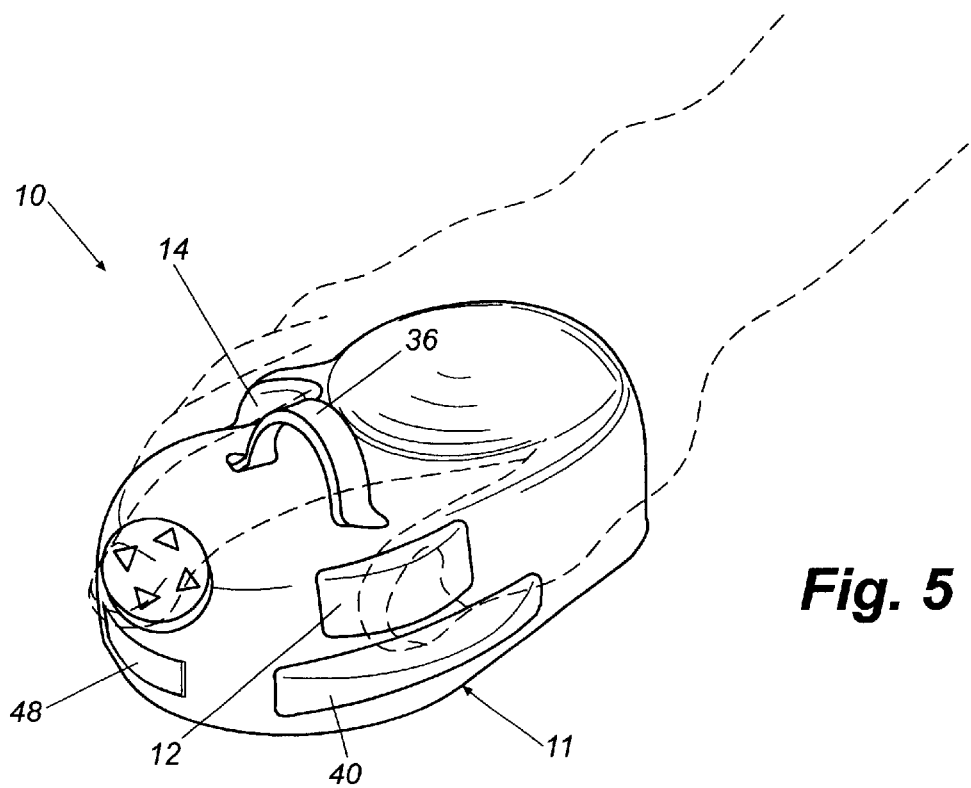
FIG. 5 is a perspective view of an alternative embodiment with the cursor control being located in center of the device with a button on the side.

Illustrated in FIG. 5 is the cursor control device 10 with a thumb self 40 upon which the user may rest his or her thumb when the thumb is not being used to manipulate the cursor control 16 or depress a button 12 or 14. The user may use a detachable ring 36 to wrap around the user's finger so that the cursor control device 10 can be used while hand held without having to be grasped.

Also illustrated in FIG. 5 is an alternative wireless embodiment of the cursor control device 10 which contains a transparent shade 48 through which infra-red or radio frequencies can be transmitted to a computer, receiver or other processing unit. Such an embodiment would also contain a housing and door for batteries (not shown) for electrical power. Such a housing and door could be located on the bottom or either side of the body 11. The cursor control device 10 is not limited to these or any particular wireless technique, but can be made to incorporate different and new technology as would best effectuate the objects of the cursor control device 10.

Figure 6A:
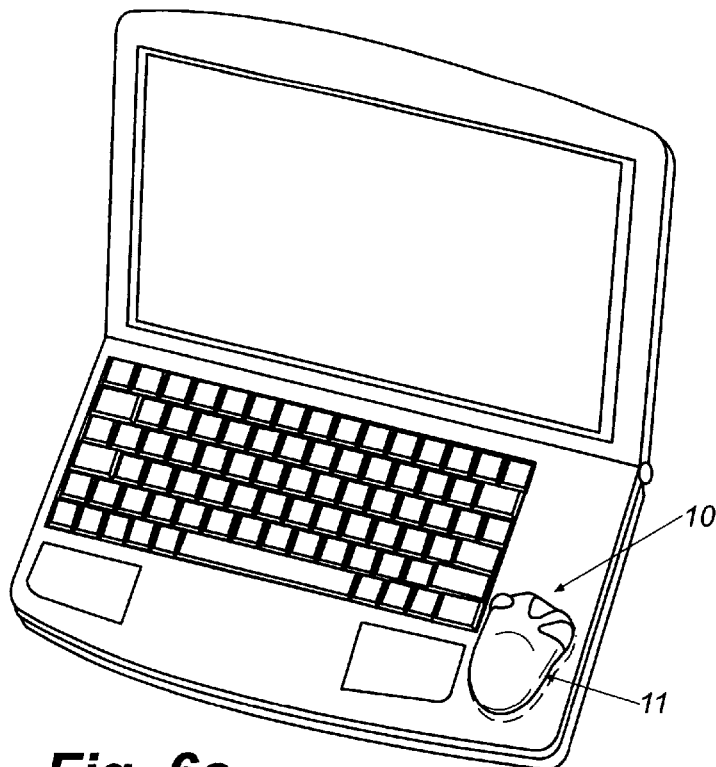
FIG. 6a is a top view of an alternative embodiment in which the removable cursor control device is in a housing in a laptop computer.
Figure 6B:
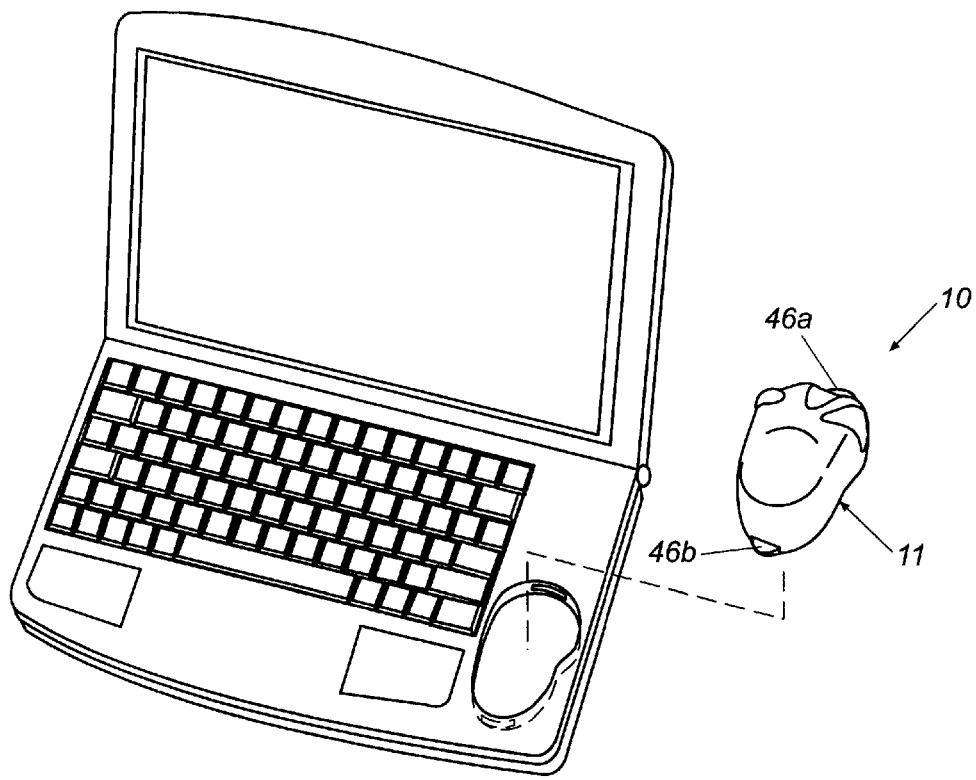
FIG. 6b is a top view of the removable cursor control device when removed from the housing in a laptop computer.

Illustrated in FIGS. 6a and 6b is an alternative embodiment of the cursor control device 10 using locking mechanisms 46a and 46b to secure the device 10 into a housing in a laptop computer. In this embodiment the cursor control device 10 can be used in a desktop manner (FIG. 6a) or, by removing the cursor control device 10 from the housing, in a hand held manner (FIG. 6b). The locking mechanisms 46a and 46b consists of electronic circuitry through which the cursor control device 10 sends data to the laptop computer when placed in the housing (FIG. 6a). A wireless technique or cable 18 (FIG. 2) may be used to transmit data to laptop computer when the cursor control device 10 is removed from the housing (FIG. 6b). In this embodiment, the body 11 may be smaller than previously described so as to be able to fit into the base of the laptop computer.

Figure 7:
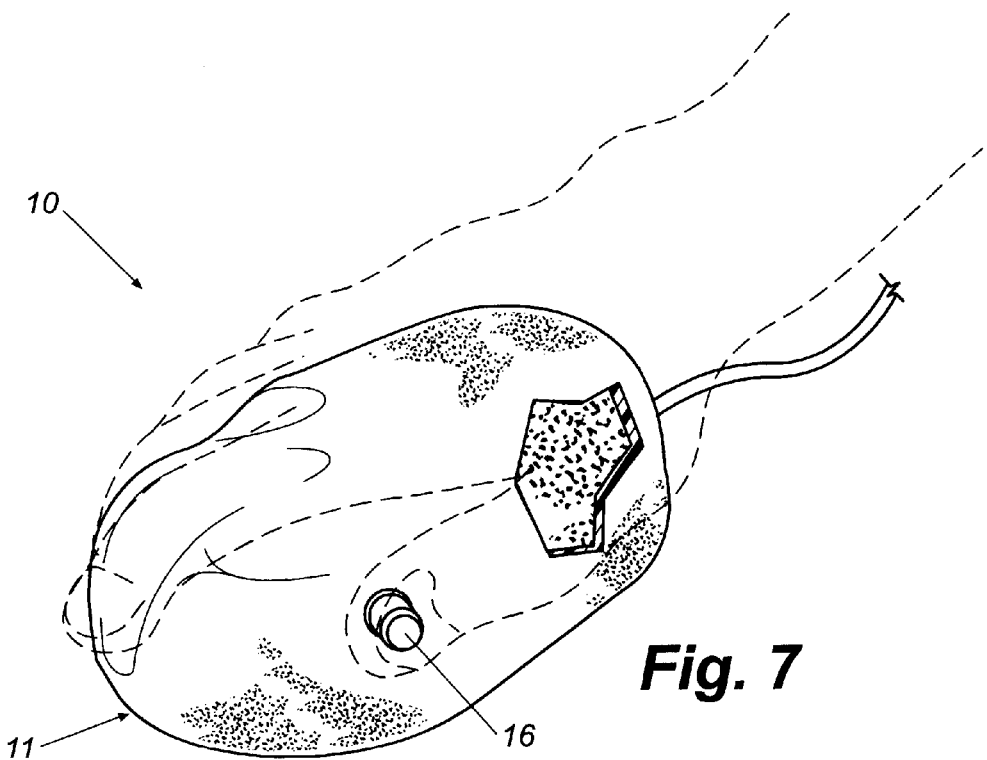
FIG. 7 is a view of an alternative embodiment with the body of the cursor control device being made of a conforming material during work-surface use.
Figure 8:
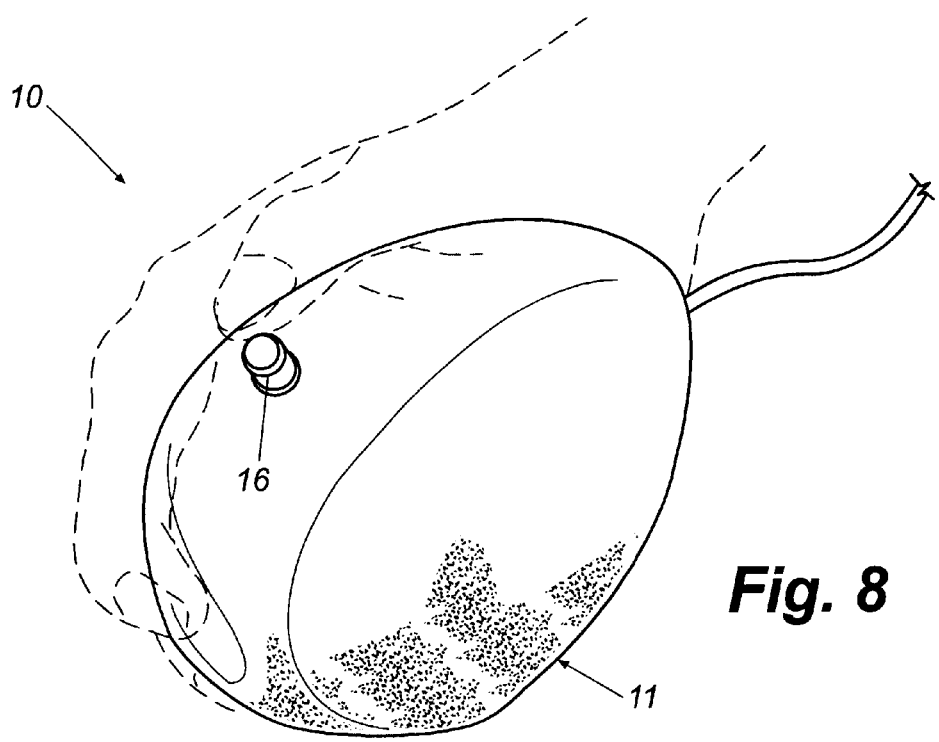
FIG. 8 is a view of an alternative embodiment with the body of the cursor control device being made of a conforming material during hand held use.

Illustrated in FIGS. 7 and FIG. 8 is an embodiment of the cursor control device 10 in which the body 11 is made of a hand conforming material, such as plastic, durable foam, rubber, neoprene, "bean-bag," or other malleable material and the like which would adjust to the shape of the user's hand as it is held. In this embodiment, the cursor control device 10 could be used while resting on the desktop (as shown in FIG. 7) or while being hand held (FIG. 8). FIGS. 7 and 8 further illustrate an embodiment of the cursor control device 10 in which the cursor control 16 is an isometric post, though the cursor control 16 in this embodiment may be any of the types previously described and the like.

The cursor control device 10 provides a design for convenient and comfortable hand held or desktop use. The cursor control device 10 produces a new different function from other cursor control devices in that it allows for both hand held and desktop use in a convenient and comfortable manner. During work surface use, as shown in FIG. 2, the cursor control device 10 consumes very little desktop space and needs no additional space for movement and so can be used when there is no or insufficient area on the desktop. It also obviates the need for a prime work surface, thus making mousepads unnecessary. During hand held use, as shown in FIG. 3, the cursor control device 10 allows the user complete freedom of hand, arm and body movement.

The ability to use the cursor control device 10 while hand held or while on the desktop is ideal for reducing fatigue in the user's arm and allowing the user the greatest freedom of movement, which reduces RSIs associated with use of cursor control devices. Because movement of the cursor using the cursor control device 10 is achieved using the finger or thumb, the user can, at all times, keep his or her hand and arm still or in any position desired. Also, when the cursor control device 10 is being used in a hand held manner no button needs to be pressed to begin cursor movement or to alternate between desktop and hand held uses. Also, movement of the cursor is controlled by the user's finger or thumb which is best suited for the fine motor control needed over the cursor.

The cursor control device 10 can be used to fully control the cursor no matter what position the cursor control device 10 is held such that the position of the device 10 need not correlate with the direction the cursor is moved. The cursor control device 10 weighs approximately 1 to 3 ounces, which is light enough so as not to strain the user's arm or hand during prolonged use. When the desktop is at an uncomfortable height, the user can simply place the cursor control device 10 in his or hand.

Because the user can hold his or her hand in any position during use of the cursor control device 10, the need for breaks to rest his or her arm is eliminated. Moreover, because of this total freedom of movement, the cursor control device 10 can be used in the natural neutral hand position, instead of the unnatural palm-down position, even when the user chooses to rest his or hand on the desktop.

It should now be understood that what has been disclosed herein comprises a novel cursor control device 10. Those having skill in the art, to which the cursor control device 10 pertains, will now, as a result of the applicant's teachings herein, perceive various modifications and additions which may be made to the cursor control device 10. For example, the features described herein may be altered or omitted in varying ways while achieving the listed benefits. The cursor control device 10 may also be scaled to a smaller size to be suitable for use by children, or for traveling, can be customized to fit into an individual users hand, and can be made in various colors. It is intended that all such additional features and advantages be included herein within the scope of the present invention.

Accordingly, the scope of the cursor control device 10 should be determined not by the embodiment illustrated, but by the appended claims and their legal equivalents. All such modifications and additions are deemed to be within the scope of the invention which is to be limited only by the claims appended herein. It is to be understood that the drawings are for the purpose of illustration only and are not included as any limitation of the scope of the cursor control device 10.

I claim:

1. A cursor control device comprising:

a body with a shape for fitting in a user hand so a user can operate said cursor control device in desk-top and off the desk-top manners;

a cursor control on said body;

at least one button on said body;

a control circuit inside said body connected to said at least one button and said cursor control;

a communication link connectable between said control circuit and a processing unit; and a plurality of touch-sensitive input keys on bottom of said body.

2. A cursor control device comprising:

a body with a shape for fitting in a user hand so a user can operate said cursor control device in desk-top and off the desk-top manners;

a cursor control on said body;

at least one button on said body;

a control circuit inside said body connected to said at least one button and said cursor control;

a communication link connectable between said control circuit and a processing unit; and a touch-sensitive display screen on bottom of said body.

* * * * *

UNITED STATES PATENT AND TRADEMARK OFFICE
CERTIFICATE OF CORRECTION

PATENT NO. : 6,545,667 B1
DATED : April 8, 2003
INVENTOR(S) : David M. Lilenfeld It is certified that error appears in the above-identified patent and that said Letters Patent is hereby corrected as shown below:

<u>Title page,</u>
Item [76], should read:
-- Inventor: David M. Lilenfeld, 424 Lindbergh Drive, #305
Atlanta, Georgia 30305 --

Signed and Sealed this

Fifth Day of August, 2003

JAMES E. ROGAN
*Director of the United States Patent and Trademark Office*